(12) United States Patent
Jeong

(10) Patent No.: US 10,846,951 B2
(45) Date of Patent: Nov. 24, 2020

(54) APPARATUS AND METHOD FOR CORRECTING OPTION MISJUDGMENT OF CONTROL UNIT

(71) Applicants: HYUNDAI MOTOR COMPANY, Seoul (KR); KIA MOTORS CORPORATION, Seoul (KR)

(72) Inventor: Jeong-Hee Jeong, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 119 days.

(21) Appl. No.: 16/205,597

(22) Filed: Nov. 30, 2018

(65) Prior Publication Data

US 2020/0066064 A1 Feb. 27, 2020

(30) Foreign Application Priority Data

Aug. 22, 2018 (KR) ........................ 10-2018-0098041

(51) Int. Cl.
*G07C 5/08* (2006.01)
*H04L 29/08* (2006.01)

(52) U.S. Cl.
CPC ................ *G07C 5/08* (2013.01); *H04L 67/12* (2013.01)

(58) Field of Classification Search
CPC ... H04L 67/12; B60W 50/0205; B60W 40/10; B60W 2050/021; B60W 2050/0215; B60W 2556/50; G07C 5/08
USPC ....................................................... 701/32.3
See application file for complete search history.

(56) References Cited

U.S. PATENT DOCUMENTS

| | | | |
|---|---|---|---|
| 8,682,525 B1 * | 3/2014 | Kalinadhabhotla | G07C 5/008 701/36 |
| 2002/0105442 A1 * | 8/2002 | Flick | G01S 19/34 340/988 |
| 2010/0235891 A1 * | 9/2010 | Oglesbee | H04W 4/029 726/5 |
| 2011/0175569 A1 * | 7/2011 | Austin | B60L 53/63 320/109 |
| 2014/0207318 A1 * | 7/2014 | Sisk | B60L 58/12 701/22 |
| 2014/0240088 A1 * | 8/2014 | Robinette | G08B 13/1427 340/5.61 |
| 2016/0101775 A1 * | 4/2016 | Gibson | B60K 6/40 701/22 |
| 2017/0069144 A1 * | 3/2017 | Lawrie-Fussey | G06Q 10/20 |
| 2017/0080919 A1 * | 3/2017 | Follen | F02N 11/0837 |
| 2017/0130635 A1 * | 5/2017 | Smith | F01N 11/002 |
| 2017/0136912 A1 * | 5/2017 | Ricci | B60L 3/0015 |
| 2017/0294054 A1 * | 10/2017 | Rosenbaum | G07C 5/008 |
| 2018/0095609 A1 * | 4/2018 | Merg | G06F 3/0482 |
| 2018/0257492 A1 * | 9/2018 | O'Hara | H01M 10/425 |

(Continued)

FOREIGN PATENT DOCUMENTS

| | | |
|---|---|---|
| KR | 20070059378 A | 6/2007 |
| KR | 101655685 B1 | 9/2016 |

*Primary Examiner* — Atul Trivedi
(74) *Attorney, Agent, or Firm* — Morgan, Lewis & Bockius LLP

(57) ABSTRACT

An apparatus for correcting option misjudgment of a control unit includes a location information searcher for generating location information of a vehicle. The control unit changes and applies an option value of the vehicle in response to an abnormal mode when a current location of the location information is in the abnormal mode.

19 Claims, 3 Drawing Sheets

(56) References Cited

U.S. PATENT DOCUMENTS

| | | | | |
|---|---|---|---|---|
| 2018/0334157 A1* | 11/2018 | Tanaka | ............... | G01C 21/3407 |
| 2019/0071067 A1* | 3/2019 | Leone | ................. | F02D 41/3005 |
| 2019/0266808 A1* | 8/2019 | Merg | ..................... | G06Q 10/20 |
| 2020/0070679 A1* | 3/2020 | Wang | ................. | H01M 2/1083 |

* cited by examiner

APPARATUS AND METHOD FOR CORRECTING OPTION MISJUDGMENT OF CONTROL UNIT

CROSS-REFERENCE TO RELATED APPLICATION

This application claims priority to Korean Patent Application No. 10-2018-0098041 filed on Aug. 22, 2018 in the Korean Patent Office, which is incorporated herein by reference in its entirety.

TECHNICAL FIELD

The present disclosure relates to a technology for correcting option misjudgment between control units, and more particularly, to an apparatus and a method for correcting option misjudgment of a control unit, which can accurately determine a vehicle option without misjudgment to normally operate the function according to the vehicle option.

BACKGROUND

Generally, there occurs a management problem according to an increase in a part number that a vehicle option becomes various, and a control unit identifies various vehicle options with its part number or a local input.

In addition, there are increasingly the cases that receive and process the option via a Control unit Area Network (CAN) due to an increase in the wiring cost occurred by adding the local input. Accordingly, a logic for determining the vehicle option of the control unit is designed.

That is, it is defined as the logic because the phenomenon, in which the option is continuously changed to normally operate the function of the vehicle and then abnormally operate it, can be repeated.

However, in such a logic, the vehicle can be assembled by a normal procedure.

However, there occur the cases where an operator operates and starts a vehicle in the state that a transmission control unit for transmitting the corresponding option is mounted incorrectly, or the transmission control unit is detached or some connectors are detached in the factory repair place or service center. In this case, there occurs a problem that erroneously determines an option value.

In this case, since the corresponding option is maintained until a battery is reset after completing the operation, there occurs the case where the vehicle malfunctions due to option misjudgment. For example, an Auto Transmission (AT) and a Manual Transmission (MT) are erroneously determined, and thereby, an AT vehicle can operate as a MT vehicle. Alternatively, the MT vehicle can operate as the AT vehicle. Alternatively, there occurs a problem in that a vehicle with mirror folding is determined as a vehicle having no mirror folding, thus not executing the mirror folding operation, etc.

The contents described in Description of Related Art are to help the understanding of the background of the present disclosure, and can include what is not previously known to those skilled in the art to which the present disclosure pertains.

SUMMARY OF THE DISCLOSURE

The present disclosure is intended to solve the problems, and an object of the present disclosure is to provide an apparatus and a method for correcting option misjudgment of a control unit, which can accurately determine a vehicle option without misjudgment to normally operate the function according to the vehicle option.

In addition, another object of the present disclosure is to provide an apparatus and a method for correcting option misjudgment of a control unit, which can prevent the function of the vehicle from abnormally operating according to the vehicle option when the vehicle has been delivered to a customer by erroneously determining the vehicle option during assembly, repair, or maintenance.

In order to achieve the objects, the present disclosure provides an apparatus for correcting option misjudgment of the control unit, which can accurately determine the vehicle option without misjudgment to normally operate the function according to the vehicle option.

An apparatus for correcting option misjudgment of a control unit includes: a location information searcher for generating location information of a vehicle, wherein the control unit changes and applies an option value of the vehicle in response to an abnormal mode when a current location of the location information is in the abnormal mode.

The changed option value is maintained in a confirmed state during the abnormal mode.

The changed option value becomes a confirmed state when the abnormal mode is transited to a predetermined normal mode to be stored in a memory.

The abnormal mode indicates the state that the vehicle is in a repair center or a factory region for repair.

The normal mode indicates the state that the vehicle is in a region except for a repair center or a factor region.

The changed option value is stored in the memory upon receiving the same communication signal during a predetermined reference time after the start of the vehicle in the normal mode.

The changed option value is maintained until a battery is reset.

The changed option value is applied when a predetermined setting time elapses after the ignition-on of the vehicle.

A predetermined initial option value is stored and maintained when a predetermined setting time does not elapse after the ignition-on of the vehicle.

The initial option value is selectively stored or not stored.

According to another embodiment of the present disclosure, a method for correcting option misjudgment of a control unit includes: generating location information of a vehicle by a location information searcher; determining whether or not the current location of the location information is in an abnormal mode by the control unit; and changing and applying an option value of the vehicle in response to the abnormal mode as a determination result by the control unit.

According to the present disclosure, it is possible to accurately determine the vehicle option without misjudgment to normally operate the function according to the vehicle option.

In addition, as another effect of the present disclosure, it is possible to reduce the possibility that the vehicle option is erroneously determined because there is no confirming the vehicle option in the factory mode, thus normally proceeding the production speed of the vehicle in the factory.

In addition, as still another effect of the present disclosure, it is possible to enhance convenience of the operation because the factory operator does not have to perform the reset of the battery.

In addition, as yet another effect of the present disclosure, it is possible to stay the vehicle in the confirmed section in the option determination during repair of the vehicle, thus reducing the malfunction of the vehicle function after the repair by confirming the corresponding option.

In addition, as still yet another effect of the present disclosure, it is possible to add a lot of options, thus preventing the part number from increasing exponentially.

DESCRIPTION OF SPECIFIC EMBODIMENTS

Figure 1:
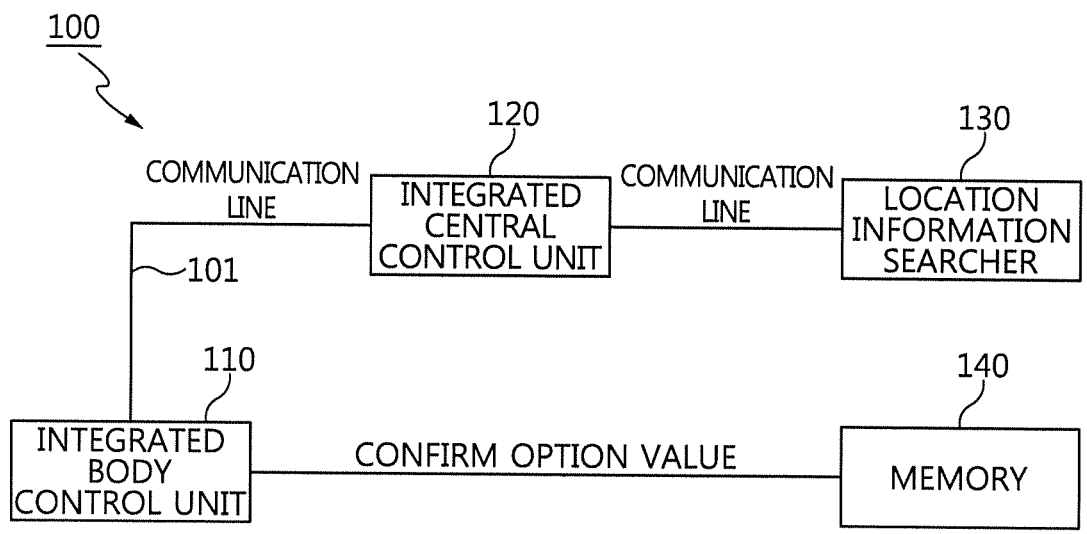
FIG. 1 is a block diagram of a configuration of an apparatus for correcting option misjudgment of a control unit in accordance with an embodiment of the present disclosure.

Various modifications and various embodiments can be made in the present disclosure, so that specific embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," etc. can be used to illustrate various components, but the components should not be limited by the terms. The terms are used only to differentiate one component from another component.

For example, a first component can be referred to as a second component, and similarly, the second component can be also referred to as the first component without departing from the scope of the present disclosure. The terms "and/or" includes a plurality of related listed items or any of a plurality of related listed items.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, an apparatus and a method for correcting option misjudgment of a control unit in accordance with an embodiment of the present disclosure will be described in detail with reference to the accompanying drawings.

FIG. 1 is a block diagram of a configuration of an apparatus for correcting option misjudgment of a control unit in accordance with an embodiment of the present disclosure. Referring to FIG. 1, the apparatus 100 can be configured to include a location information searcher 130 for generating location information of a vehicle, control units 110, 120 for changing and applying a predetermined option value of the vehicle in response to a predetermined abnormal mode when the current location of the location information is in the predetermined abnormal mode, a memory 140 for storing the changed option value, etc.

The control units 110, 120 can be composed of an integrated body control unit 110 and an integrated central control unit 120.

The location information searcher 130 acquires location information (e.g., Global Positioning System (GPS) information) to transmit it to the integrated central control unit 120. The location information searcher 130 can be a navigation, an Audio Video Navigation (AVN), etc.

The location information searcher 130 can transmit the GPS information to the integrated central control unit 120 when the current location of the vehicle is in a repair center or a factory.

The integrated central control unit 120 determines whether or not it is in a predetermined abnormal mode based on the current location of the location information, and adds a repair center mode thereto. It is also possible to pre-configure the repair center mode.

The integrated body control unit 110 determines the current mode of the vehicle, and changes and applies an option value according to the determined mode. That is, it is changed to the option value corresponding to the abnormal mode and applied to the vehicle, and the changed option value is stored in the memory 140.

That is, according to a predetermined mode switching table, the mode is switched from the current mode to the corresponding mode. Then, the option value is changed and applied according to the switched corresponding mode. An example of the mode switching table is as follows.

TABLE 1

| Condition 1 | Condition 2 | Determination Mode | Remarks |
| --- | --- | --- | --- |
| Factory mode | | Factory mode | |
| Factory mode | Push an OK button of a wheel remote controller | Dealer mode | |
| Dealer mode | Push an OK button of a wheel remote controller | Customer mode | |
| Factory mode | Drive at 100 KM or more | Customer mode | |
| Dealer mode | Drive at 100 KM or more | Dealer mode | |
| Factory mode | Location information: factory | Factory mode | Added mode |
| Dealer mode | Location information: factory | Factory mode | |
| Customer mode | Location information: factory | Factory mode | |
| Factory mode | Location information: repair center | Repair center mode | |
| Dealer mode | Location information: repair center | Repair center mode | |
| Customer mode | Location information: repair center | Repair center mode | |

As illustrated in the Table, even if the condition 1 corresponds to the dealer mode, the factory mode, or the customer mode, the condition 2 becomes the factory mode or the repair center mode according to the location information. Herein, the factory mode indicates the state where the vehicle is in the factory. This can correspond to all the cases that the vehicle is during assembly or for repair after shipment. Accordingly, the initial becomes the factory mode (as illustrated in the top row in Table 1). The dealer mode indicates the state that the vehicle is on the dealer after shipment. A personal mode indicates the state that the vehicle has been sold to the individuals via the dealer.

Accordingly, in condition 1, when the OK button (not illustrated) of the wheel remote controller (not illustrated) is pushed for a long time in the factory mode, it is determined as the willingness to change it to the dealer mode to be changed to the dealer mode. In addition, in the dealer mode, when the OK button of the wheel remote controller is pushed for a long time, it is determined as the willingness to change it to the customer mode to be changed to the customer mode. In addition, in the factory mode or the dealer mode, it is determined as a driving distance of the degree that has been delivered to the customer upon driving at 100 km or more to be changed to the customer mode. In the corresponding mode, the integrated central control unit 120 has a value therein, and the state of each mode is transmitted to a communication line 101.

The factory mode, the dealer mode, and the customer mode are possible even by setting. In contrast, it is also possible to determine which mode the vehicle is currently in by comparing it with predetermined location information. That is, it is possible to database and store the location information of the respective factories and the location information of the dealers in the memory 140 upon shipment from the factory, or to newly input them.

The memory 140 can be a memory provided in the control units 110, 120, and can be a separate memory. Accordingly, it can be configured by a combination of a non-volatile memory such as a Solid State Disk (SSD), a hard disk drive, a flash memory, an Electrically Erasable Programmable Read-Only Memory (EEPROM), a Static RAM (SRAM), a Ferro-electric RAM (FRAM), a Phase-change RAM (PRAM), or a Magnetic RAM (MRAM) and/or a volatile memory such as a Dynamic Random Access Memory (DRAM), a Synchronous Dynamic Random Access Memory (SDRAM), or a Double Date Rate-SDRAM (DDR-SDRAM). In addition, the memory 140 can also operate in association with a web storage or a cloud server, which is connected by wireless communication to perform the storage function on the internet.

The communication line 101 can be a Multimedia-Controller Area Network (MM-CAN), a Body-Controller Area Network (B-CAN), a high-speed Controller Area Network (CAN), a communication line (e.g., 500 kbps), a CAN-Flexible Data-Rate (CAN-FD) communication line, a Flexlay communication line, a Local Interconnect Network (LIN) communication line, a Power Line Communication (PLC) communication line, a Control Pilot (CP) communication line, etc. Accordingly, an upper control unit delivers the command to a lower control unit while exchanging information with each other between the control units 110, 120.

Figure 2:
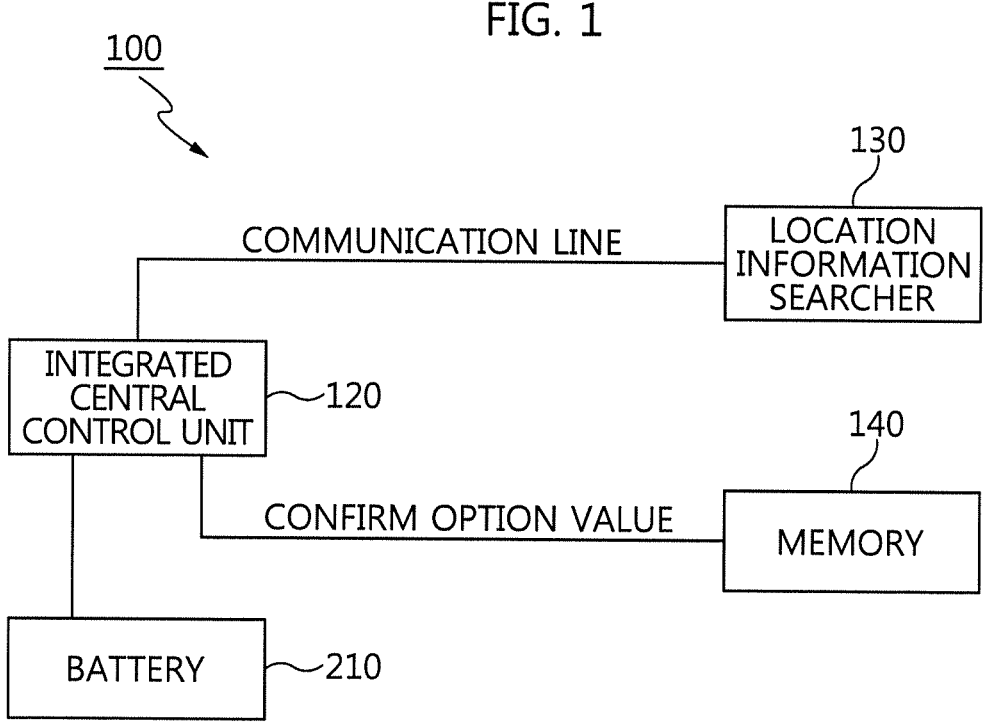
FIG. 2 is a block diagram of a configuration of an apparatus for correcting option misjudgment of a control unit in accordance with another embodiment of the present disclosure.

FIG. 2 is a block diagram of a configuration of an apparatus for correcting option misjudgment of a control unit in accordance with another embodiment of the present disclosure. Unlike FIG. 1, FIG. 2 does not use the integrated body control unit 110, and performs the entire option misjudgment correction in the integrated central control unit 120. Referring to FIG. 2, the integrated central control unit 120 determines whether or not it is in a predetermined abnormal mode based on the current location of the location information, and adds a repair center mode thereto. In addition, the integrated central control unit 120 determines the current mode of the vehicle, and changes and applies an option value according to the determined mode. That is, it is changed to the option value corresponding to the abnormal mode and applied to the vehicle, and the changed option value is stored in the memory 140.

In addition, a battery 210 can be configured therein. The battery 210 supplies power to the components.

The battery 210 can have a battery cell (not illustrated) connected in series and/or in parallel, and the battery cell can be a high voltage battery cell for an electric vehicle such as a nickel metal battery cell, a lithium ion battery cell, a lithium polymer battery cell, or a solid state battery cell. Generally, the high voltage battery is a battery used as a power source for moving the electric vehicle and refers to a high voltage of 100V or more. However, it is not limited thereto, and a low voltage battery is also possible.

In the various embodiments of the present disclosure, each of the integrated body control unit 110, the integrated central control unit 120, and the location information searcher 130 may be a processor (CPU) and the functions thereof may be performed individually, or embedded in a central processing unit as one unit.

Figure 3:
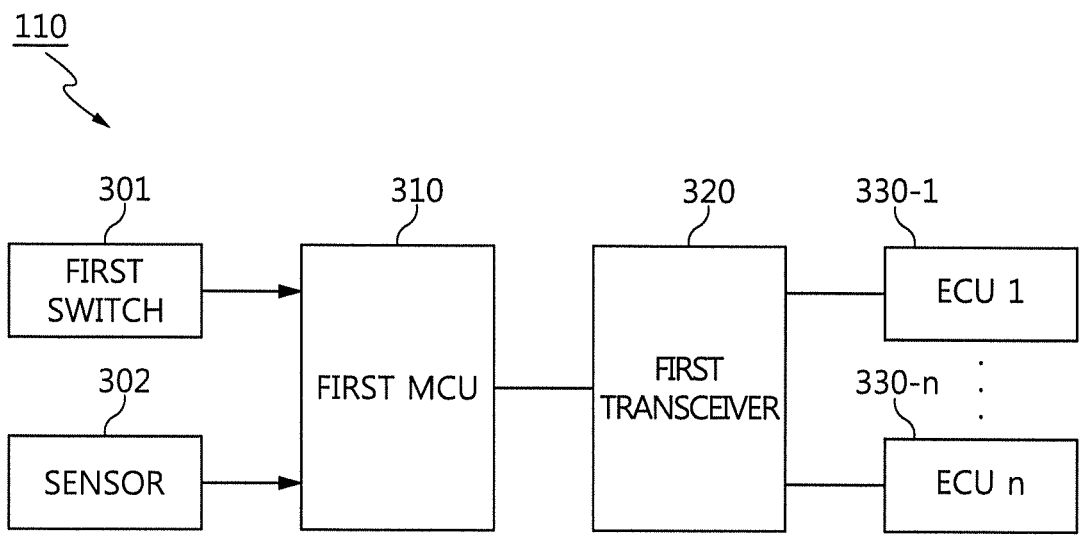
FIG. 3 is a block diagram of a detailed configuration of an integrated body control unit illustrated in FIG. 1.

FIG. 3 is a block diagram of a detailed configuration of the integrated body control unit 110 illustrated in FIG. 1. Referring to FIG. 3, the integrated body control unit 110 may include a first Micro Control Unit (MCU) 310, a first transceiver 320, etc. The first MCU 310 can be composed of a microprocessor, a microcomputer, an electronic circuit, etc, and performs the function of the integrated body control unit. Generally, the integrated body control unit 110 performs the functions of a Body Control Unit (BCM), a Smart Key System (SMK), and a Tire Pressure Monitoring System (TPMS).

Accordingly, it performs the communication with first to $n^{th}$ electronic control units 330-1 to 330-$n$ through the first transceiver 320. The first to $n^{th}$ electronic control units 330-1 to 330-$n$ can be composed of a wiper (not illustrated), a head lamp (not illustrated), a power seat (not illustrated), a Lane Keeping Assist System (LKAS), an electronic circuit for controlling a Door Drive Module (DDM), etc., a processor, an Integrated Circuit (IC), etc. That is, the first MCU 310 processes operation information through a first switch 301 and a sensor 302 to execute a control command for the corresponding electronic control units 330-1 to 330-$n$.

Figure 4:
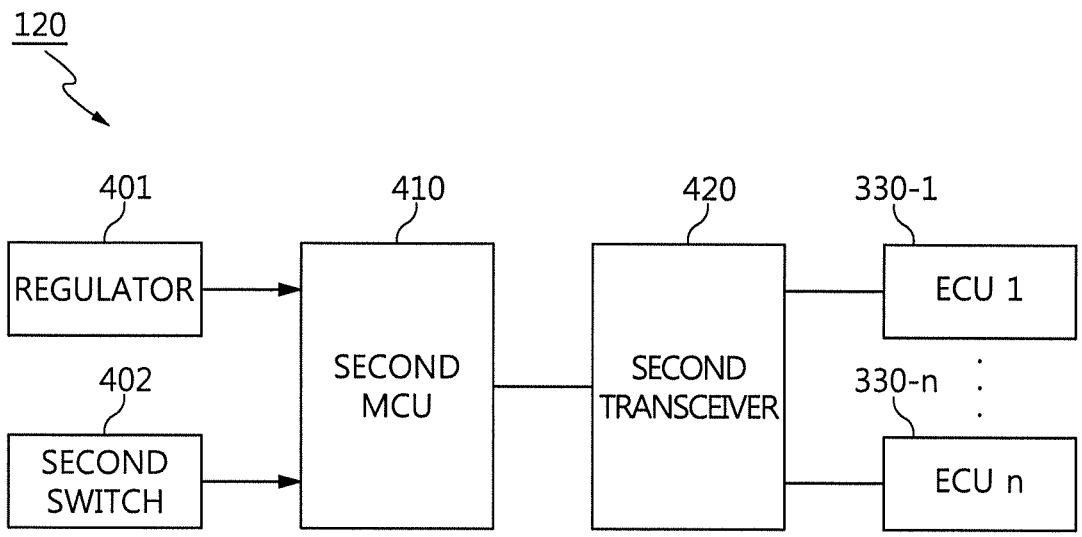
FIG. 4 is a block diagram of a detailed configuration of an integrated central control unit illustrated in FIG. 2.

FIG. 4 is a block diagram of a detailed configuration of the integrated central control unit 120 illustrated in FIG. 2. Referring to FIG. 4, the integrated central control unit 120 can be configured to include a second Micro Control Unit (MCU) 410, a second transceiver 420, etc. The second MCU 410 can be composed of a microprocessor, a microcomputer, an electronic circuit, etc., and performs the function of the integrated central control unit. Generally, the integrated central control unit 120 performs the functions of a Central Gateway (CGW), a Smart Junction Box or Smart Junction Block (SJB), and a Body Control Unit (BCM).

Accordingly, it performs the communication with first to $n^{th}$ electronic control units 430-1 to 430-$n$ through the second transceiver 420. The first to $n^{th}$ electronic control units 430-1 to 430-$n$ can be composed of an electronic circuit for controlling a battery power distribution box (not illustrated), a dark current shutoff system (not illustrated), a switch box (not illustrated), an engine Engine Management System (EMS), an Air Bag Control Unit (ACU), etc., a processor, an Integrated Circuit (IC), etc. That is, the second MCU 410 processes input information through a second switch 402 and a regulator 401 to execute a control command for the corresponding electronic control units 430-1 through 430-$n$.

Figure 5:
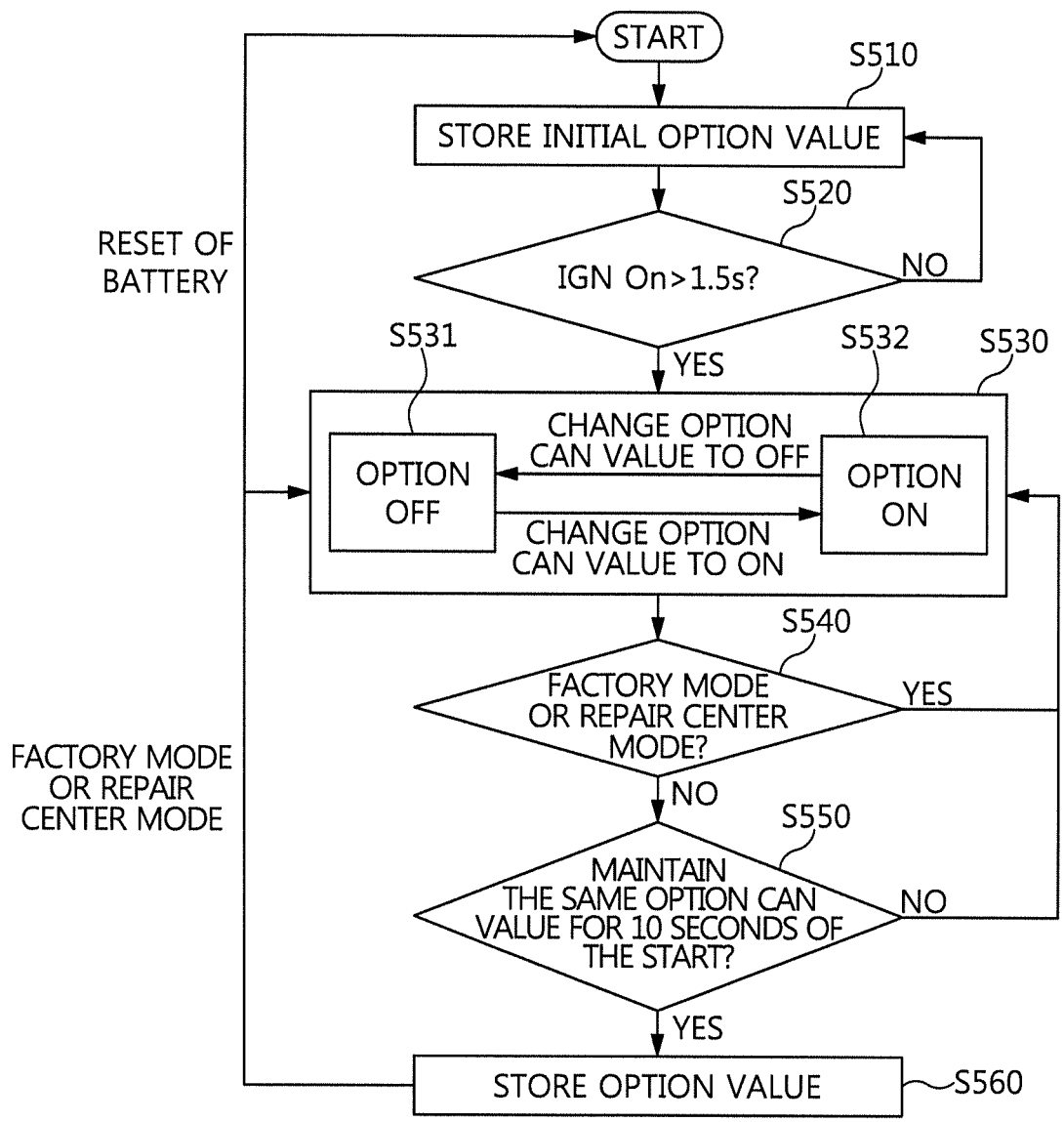
FIG. 5 is a flowchart illustrating a procedure for correcting the option misjudgment of the control unit in accordance with an embodiment of the present disclosure.

FIG. 5 is a flowchart illustrating a procedure for correcting option misjudgment of the control unit 110 or 120 in accordance with an embodiment of the present disclosure. Referring to FIG. 5, an initial option value is stored S510.

That is, the initial option value can be selectively stored or not stored through a button (not illustrated) installed in the vehicle. That is, the initial option value is stored when the ON button is selected, and the initial option value is not stored when the OFF button is selected.

Then, when the elapsed time after the ignition ON (IGN ON) of the vehicle does not exceed a predetermined setting time (about 1.5 seconds), the initial option value is continuously maintained S520.

In contrast, in the S520, when the elapsed time after the ignition ON of the vehicle exceeds the setting time, the option value is changed by reflecting the received value (e.g., the CAN value) that is received for the option S530. That is, it is possible to change it from an option OFF 531 to an option ON 530 or to change it from the option ON 530 to the option OFF 531. An exemplary option list that can apply the corresponding improvement logic in the control unit 110 or 120 is illustrated in the following table.

TABLE 2

| Option | Option value transmission control unit | Option value reception control unit | Descriptions |
| --- | --- | --- | --- |
| AT, MT | ENG EMS | ICU, IBU | Auto door lock/unlock setting value is changed according to whether or not it is AT or MT. Whether or not a remote ignition operation is performed, the operation of an R-stage interlocking wiper, and a control logic of a shift lever are changed. |
| SMK OPT | IBU | ICU | Whether or not the remote ignition operation is performed is determined according to whether or not it is a SMK option |
| Mirror folding option | ICU or DDM | IBU | Whether or not the mirror folding operation is performed is determined according to whether or not it is the mirror folding option |
| Airbag option | ACU | ICU | Whether or not the auto lock operation is performed or applied is determined according to whether or not the airbag is applied |
| HBA option | LKAS | IBU | Whether or not a HBA operation is performed is determined according to whether or not the HBA option is applied |

In the Table, the HBA refers to a High Beam Assist. Particularly, Table 2 is an example for understanding, and other than those listed in the Table are applicable.

Still referring to FIG. 5, the operation for repair, etc. is performed in the state that the transmission control unit has been detached and upon the start operation for 10 seconds, an erroneous option of the vehicle is erroneously learned and thereby, the vehicle cannot operate normally. Accordingly, the option value is changed while the vehicle is in the factory mode or repair center mode for repair. For example, when an Auto Transmission (AT) is changed to a Manual Transmission (MT) in the factory or the repair center, the option value for the AT is changed from ON to OFF, and the option value for the MT is changed from OFF to ON.

The option value changed in the S530 is temporarily applied, and is not yet stored in the memory 140 decidedly. That is, it is maintained in a tentatively-confirmed state during the factory mode and the repair center mode.

Then, the control unit 110 or 120 determines whether or not the current state of the vehicle is in the factory mode or the repair center mode S540.

As the determination result, when the current state of the vehicle is in the factory mode or the repair center mode, the S530 and S540 are performed again S540.

In contrast, when the current state of the vehicle is not in the factory mode or the repair center mode, it is determined whether or not the same communication signal (i.e., the same option value) is maintained for 10 seconds after the start of the vehicle S550.

As the determination result, in the S550, when the same communication signal is maintained, the changed option value is stored in the memory 140 in the confirmed state S560. The option value stored in the confirmed state can be maintained until the battery is reset.

In contrast, in the S550, when the same communication signal is not maintained, the S530 to S550 are performed again.

When the initial option value is determined upon the reset of the battery, the option value of the vehicle is determined and stored therein after the reset.

In addition, the option value can be also determined at any time. In this case, the option value of the vehicle can be also updated at any time by updating it each time the option value is changed.

In addition, the steps of the method or the algorithm explained regarding the embodiments disclosed herein are implemented as a program command format that can be performed through various computers means to be recorded in a computer readable medium. The computer readable medium can include a program (command) code, a data file, a data structure, etc., separately or in a combination thereof.

The program (command) code recorded in the medium can be the ones specially designed or configured for the present disclosure, or can be the one known and available to those skilled in the computer software. Examples of the computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that can be executed by a computer using an interpreter, etc., as well as a machine language code made such as those produced by a complier. The hardware device can be configured to operate as one or more software modules in order to perform the operation of the present disclosure, and vice versa.

What is claimed is:

1. An apparatus for correcting option misjudgment of a control unit, comprising:
   a location information searcher for generating location information of a vehicle,
   wherein the control unit changes and applies an option value of the vehicle in response to an abnormal mode when a current location of the location information is in the abnormal mode,
   wherein the location information searcher is arranged inside the vehicle and connected to the control unit with a communication line.

2. The apparatus of claim 1, wherein the changed option value is maintained in a confirmed state during the abnormal mode.

3. The apparatus of claim 1, wherein the changed option value becomes a confirmed state when the abnormal mode is transited to a normal mode to be stored in a memory.

4. The apparatus of claim 3, wherein the abnormal mode indicates that the vehicle is in a repair center or a factory region for repair.

5. The apparatus of claim 4, wherein the normal mode indicates that the vehicle is in a region other than the repair center or factory region.

6. The apparatus of claim 3, wherein the changed option value is stored in the memory upon receiving the same communication signal during a reference period of time after the vehicle starts in the normal mode.

7. The apparatus of claim 3, wherein the changed option value is maintained until a battery is reset.

8. The apparatus of claim 1, wherein the changed option value is applied when a setting time elapses after the vehicle starts.

9. The apparatus of claim 1, wherein an initial option value is stored and maintained when a setting time does not elapse after the vehicle starts.

10. The apparatus of claim 9, wherein the initial option value is selectively stored or not stored.

11. A method for correcting option misjudgment of a control unit, comprising:
    generating, by a location information searcher, location information of a vehicle;
    determining, by the control unit, whether or not a current location of the location information is in an abnormal mode; and
    changing and applying, by the control unit, an option value of the vehicle in response to the abnormal mode as a determination result,
    wherein the location information searcher is arranged inside the vehicle and connected to the control unit with a communication line.

12. The method of claim 11, wherein the changed option value is maintained in a confirmed state during the abnormal mode.

13. The method of claim 11, wherein the changed option value becomes a confirmed state when the abnormal mode is transited to a normal mode to be stored in a memory.

14. The method of claim 13, wherein the abnormal mode indicates that the vehicle is in a repair center or a factory region for repair.

15. The method of claim 14, wherein the normal mode indicates that the vehicle is in a region other than the repair center or factory region.

16. The method of claim 13, wherein the changed option value is stored in the memory upon receiving the same communication signal during a reference period of time after the vehicle starts in the normal mode.

17. The method of claim 13, wherein the changed option value is maintained until a battery is reset.

18. The method of claim 11, wherein the changed option value is applied when a setting time elapses after the vehicle starts.

19. The method of claim 11, wherein an initial setting value is stored and maintained when a setting time does not elapse after the vehicle starts.

* * * * *